May 8, 1928.
J. F. FOSTER
1,668,893
ROLLER BEARING
Filed Sept. 8, 1925
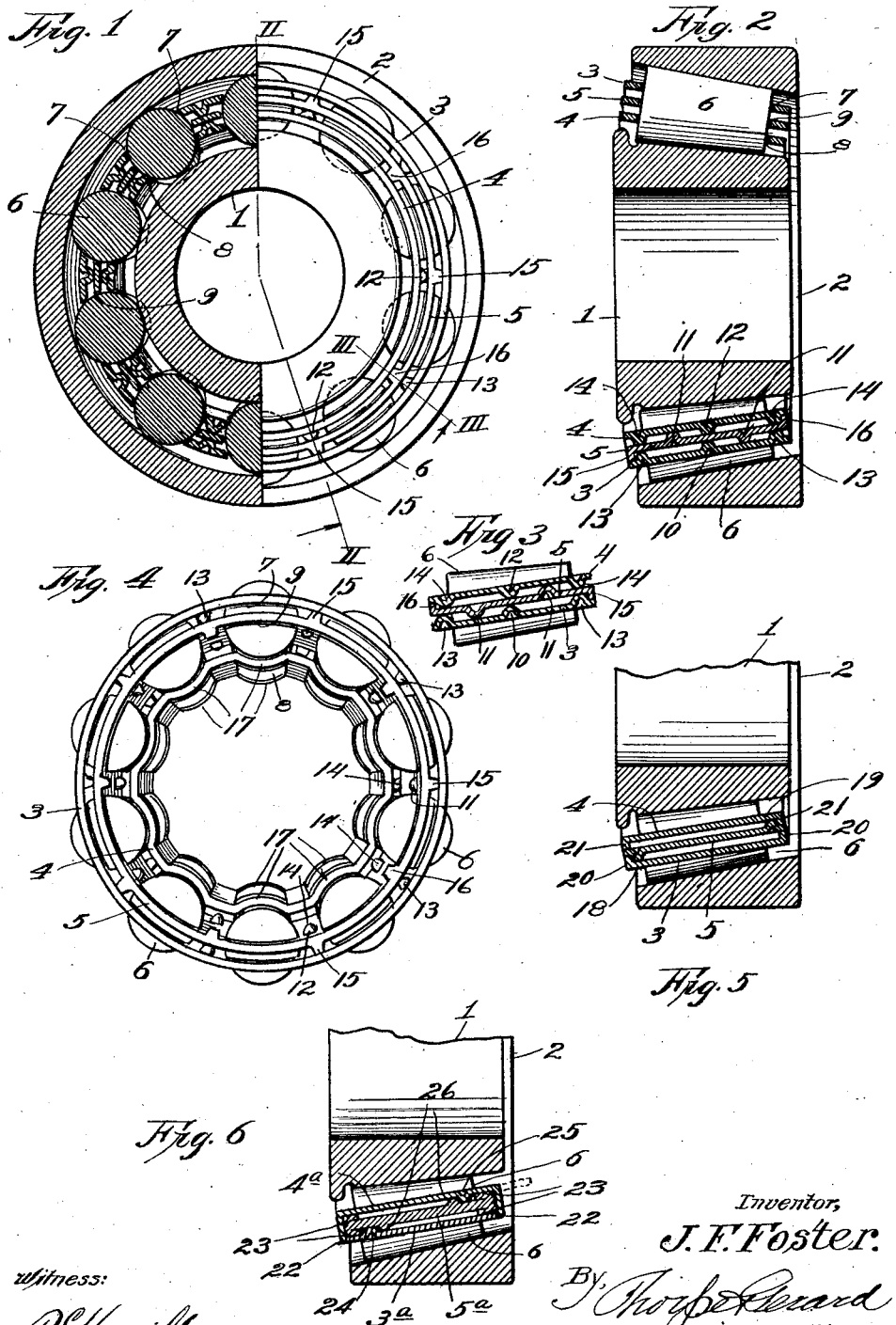
Inventor,
J. F. Foster.

Patented May 8, 1928.

1,668,893

UNITED STATES PATENT OFFICE.

JOHN F. FOSTER, OF KANSAS CITY, MISSOURI.

ROLLER BEARING.

Application filed September 8, 1925. Serial No. 54,864.

This invention relates to roller bearings and has for its object to produce a simple, economical and efficient bearing in which the rollers will be held against lateral twisting and in and out movement to insure retention of operative position and relation. A further object is to provide a roller cage making provision for a thorough and uniform distribution of the lubricant to the rollers.

A still further object is to produce a cage composed of concentric members having lugs whereby spacing apart at equal distances of the members is accomplished and relative longitudinal movement of the members is inhibited.

With these general objects in view, the invention consists in certain novel and useful features of construction and combinations of parts as hereinafter described and claimed, and in order that it may be fully understood, reference is to be had to the accompanying drawing, in which:

Figure 1 shows a tapered roller bearing as viewed from its larger end, one half of the bearing appearing in central cross section.

Figure 2 is a longitudinal section taken on the line II—II of Figure 1.

Figure 3 is a section on the line III—III of Figure 1.

Figure 4 is an end view of the rollers and the carrying cage therefor, the inner ring member of the latter being disclosed as of different shape and lesser size than it appears when complete and in final operative position.

Figure 5 is a section corresponding to the lower part of Figure 2, but of a slightly modified construction.

Figure 6 is a view like Figure 5, of another modification.

In the said drawing, 1 indicates the inner cone and 2 the outer cone of a roller bearing for automobiles and the like, the opposing faces of the cones which are arranged concentrically, bearing a tapered relation.

The cage of the bearing essentially comprises concentrically disposed ring members 3 and 4. In the preferred type of construction, there is a third ring member 5, interposed between the outer member 3 and the inner member 4, and said members, for the accommodation or reception of a series of equi-commodation spaced rollers 6, are provided with openings 7, 8 and 9, the openings 7 and 8 being narrower than the diameter of the rollers so that the latter shall be incapable of inward or outward displacement when once assembled in operative relation to the cage. The width of each opening 9 corresponds substantially to the diameter of the respective roller, and to space the member 5 centrally between the members 3 and 4, suitable lugs are provided, there being lugs projecting from the member 5 both inwardly and outwardly, lugs projecting outwardly from the inner member, and lugs projecting inwardly from the outer member. All of the lugs cooperate in accomplishing the spacing result mentioned. There are also lugs to guard against relative longitudinal slidable movement of the members which might result in their slippage or separation before the rollers are disposed in operative position. When the rollers are in operative position no such slidable separable movement can occur because each roller is occupying one set of radially alined openings 7, 8 and 9, but it is preferred to depend on the proper lugs for this result so as to avoid end friction on the rollers.

To fit or nest the ring members in operative relation, they must first be slipped one within the other with the said radial openings out of alinement, and then relatively rotated to bring said openings into radial alinement. This action is necessary because the lugs mentioned, if initially in longitudinal alinement, would prevent the ring members being nested together. They are therefore nested with the said lugs out of alinement, and are then rotated properly to bring the said openings into register and incidentally bring the lugs in longitudinal alinement, as indicated at the lower side of Figure 2, and in Figure 3, reference to the latter figure showing that it will be impossible for the inner ring member 4 to slide to the left on the ring member 5, or the outer member 3 to slide to the right on the ring member 5, and this is true regardless of the presence or absence of the rollers 6, as it is a preferred construction to prevent longitudinal sliding movements of the rings which might bring them into frictional engagement with both ends of the rollers simultaneously and thus have a clamping effect which would restrict the free rolling of the rollers on the bearings.

All of the lugs in the assembled device lie in radial planes between the rollers, and those which serve merely for the spacing of the rings 5, are best shown in Figures 2 and 3, those on rings 3 and 4 being respectively identified by numbers 10, 11 and 12.

The lugs depended upon to prevent the relative sliding movement of the rings are marginal lugs and are also best shown in Figures 2 and 3, those on rings 3 and 4, being longitudinally alined with and similar to lugs 10 and 12, and being numbered 13 and 14 respectively. On the ring 5, there are outwardly projecting marginal lugs 15 engaging the outer side of certain of the marginal lugs 13 of ring 3, and inwardly-projecting marginal lugs 16 engaging the opposite side of certain of the lugs 14 of ring 4, when the rings are adjusted rotatably to bring their openings in register, and it will be noted by reference particularly to Figures 1, 2 and 3, that lubricant can be packed and flow as freely in the spaces between the rings as between the latter and the bearing cones 1 and 2.

To provide for placing the rollers in operative position, the inner ring 4, is initially made with the parts for disposition at the ends of the rollers, pressed inwardly in concave form as at 17, thus reducing the size of the ring as a whole, so that it can be nested within the ring 5 and the circular series of rollers. The rollers are first positioned in the openings of rings 3 and 5 from within the latter, and after this is accomplished and the inner ring of reduced size as stated, is arranged as shown by Figure 4, the entire assembly is placed in a suitable lathe or other tool and the concaved parts 17 are pressed outward until the entire ring 4 is expanded and concentric with the other rings, the relative straightening of the parts 17 being depended upon to expand the diameter of ring 4 to the relative size indicated in Figure 1.

In Figure 5, is shown a slight modification of structure, in that all of the lugs have the dual functions of spacing the rings and preventing longitudinal sliding thereof. In said figure, the inner ring 5 is provided with sets of lugs 18 and 19 (only one of each being shown), projecting outward and inward respectively, near its side margins. The outer ring 5 has sets of inwardly-projecting marginal lugs 20, to interlock with outwardly-projecting lugs 18, of ring 5. The inner ring 4, has sets of inwardly-projecting marginal lugs 21 to interlock with inwardly-projecting lugs 19 of ring 5. It will be understood that in Figure 5 one or two only of the sets of lugs 18, 19, 20 and 21 appear.

In Figure 6 a second modification is shown. The inner ring $4^a$ has lugs 22 similar to lugs 21 but longer, and the outer ring $3^a$ fits between the marginal lugs 22. The intermediate ring $5^a$ has marginal lugs 23 engaging both rings $3^a$ and $4^a$, and the rings $3^a$, $4^a$ and $5^a$, are also provided with intermediate spacing lugs 24, 25 and 26. Preliminary to assemblage, the lugs 23 at one end, must stand as indicated in dotted lines, and are bent outward to operative position to inhibit endwise slippage of the rings. In this case, and also in the construction shown by Figure 5, the inner ring must be fitted to position in contracted form and later expanded, as explained in connection with the description of Figure 4.

It is contemplated to produce a good bearing without using an intermediate ring, depending in this case on the rollers 6 as the spacing mediums and for preventing endwise slippage of the rings. In this case there would be no direct contact between the rings at any point, but the inner one would have to be expanded to operative position, as already explained with respect to Figure 4.

From the above description, it will be apparent that I have produced a device of the character described which possesses all of the features of advantage pointed out as desirable, and while I have described and claimed the preferred embodiment of the same, I reserve the right to make all changes properly falling within the spirit and scope of the appended claims.

I claim:

1. In a roller bearing, a circular series of rollers and a pair of spaced rings, one within the other, in concentric relation to the rollers, the rings respectively having openings snugly receiving the rollers inward and outward of the axial centers of the latter, an intermediate ring between and spaced from the other rings and having openings snugly receiving the rollers at the points thereof of greatest diameter, and lugs between the rings, and within the planes bounded by the opposite contact surfaces of the rollers spacing the intermediate ring at fixed distances from the other rings.

2. In a roller bearing, a circular series of rollers and a pair of spaced rings, one within the other, in concentric relation to the rollers, the rings respectively having openings snugly receiving the rollers inward and outward of the axial centers of the latter, an intermediate ring between and spaced from the other rings and having openings snugly receiving the rollers at the points thereof of greatest diameter, and lugs between the rings, and within the planes bounded by the opposite contact surfaces of the rollers for preventing relative longitudinal movement of the rings.

3. In a roller bearing, a circular series of rollers and a pair of spaced rings, one within the other, in concentric relation to the rollers, the rings respectively having openings snugly receiving the rollers inward and outward of the axial centers of the latter, an intermediate ring between and spaced from the other rings and having openings snugly receiving the rollers at the points thereof of greatest diameter, and lugs between the rings, and within the planes bounded by the opposite contact surfaces of the rollers spacing the intermediate ring at a fixed distance from the other rings, and other lugs for preventing relative longitudinal movement of the rings.

In witness whereof I hereunto affix my signature.

JOHN F. FOSTER.